US009031076B2

(12) United States Patent
Lockwood

(10) Patent No.: US 9,031,076 B2
(45) Date of Patent: May 12, 2015

(54) PROCESSING REQUESTS

(75) Inventor: Oliver Lockwood, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 101 days.

(21) Appl. No.: 13/600,157

(22) Filed: Aug. 30, 2012

(65) Prior Publication Data

US 2013/0230051 A1 Sep. 5, 2013

(30) Foreign Application Priority Data

Aug. 31, 2011 (GB) .................................. 1115011.7

(51) Int. Cl.

*H04L 12/28* (2006.01)
*H04L 12/24* (2006.01)
*H04L 1/22* (2006.01)
*H04L 1/18* (2006.01)

(52) U.S. Cl.

CPC .............. *H04L 41/0654* (2013.01); *H04L 1/22* (2013.01); *H04L 1/1809* (2013.01)

(58) Field of Classification Search

CPC ..... H04L 41/0654; H04L 45/28; H04L 45/22; H04L 69/40; G06F 11/0793
USPC ................. 370/503, 467, 401, 394, 389, 352, 370/216–225, 235, 252; 709/219, 224–227; 714/4.11, 746–751; 726/13; 719/313
See application file for complete search history.

(56) References Cited

U.S. PATENT DOCUMENTS

| | | | | |
|---|---|---|---|---|
| 8,018,956 | B1 * | 9/2011 | Deng et al. | 370/401 |
| 8,413,228 | B2 * | 4/2013 | Maria | 726/13 |
| 8,503,288 | B1 * | 8/2013 | Howard | 370/217 |
| 2010/0166020 | A1 * | 7/2010 | Rantsevitch | 370/503 |
| 2010/0238828 | A1 * | 9/2010 | Russell | 370/252 |
| 2012/0281522 | A1 * | 11/2012 | Kumar et al. | 370/217 |

* cited by examiner

*Primary Examiner* — Bob Phunkulh
*Assistant Examiner* — Wali Butt
(74) *Attorney, Agent, or Firm* — EIP US LLP

(57) ABSTRACT

Measures for operating a data link, including handling transfer of operation from a primary to a backup device in the link without taking down and re-establishing the link.

26 Claims, 10 Drawing Sheets

PROCESSING REQUESTS

CROSS REFERENCE TO RELATED APPLICATION

This application claims priority to foreign Patent Application No. GB 1115011.7, filed on Aug. 31, 2011, the content of which is hereby incorporated by reference herein in its entirety.

TECHNICAL FIELD

The present disclosure relates generally to measures for operating a data link, and more specifically, but not exclusively, to a method, apparatus and computer program product for handling transfer of operation from a primary to a backup device in the link without taking down and re-establishing the link.

BACKGROUND

Telecommunications switches may establish signalling links with peer switches and/or other devices, typically over layer 2 (data link layer) protocols. These data links typically provide reliable transport for the transmission of higher layer protocol data, and the links may be between stations, each station comprising a switch or switches and/or other devices. The high availability requirements placed on telecommunications switches means that they typically need to have some level of redundancy. This may take the form of a backup system which remains on standby, ready to take over if and when a primary device fails. This failure of the old primary and ensuing transfer of operation to the backup device (which becomes the new primary) is referred to as failover.

When failover occurs, the new primary device preferably takes over quickly and minimises any disruption to communications. Due to the strict constraints of many Layer 2 protocols required to guarantee reliable transport to the higher layers, sequence numbering included in transmitted packets should typically be maintained in order to maintain a link. For most layer 2 protocols, transmitted packets include two types of sequence numbers: a first type of sequence number which serves as an identifier for each outbound message packet transmitted by the device, and is incremented each time a packet containing a new payload is transmitted; and a second type of sequence number which serves to acknowledge the corresponding sequence numbers of inbound message packets received by the device.

In current systems it is typically not possible for the backup device to monitor the packets transmitted by the primary device, as typically there is no physical connection between the output of the primary device and the input of the backup device. Furthermore, there is no reliable way to synchronise transmitted sequence numbers between the primary and backup devices as failure could occur at any point (i.e. post-synchronisation but pre-transmission, or post-transmission but pre-synchronisation). Hence, during a failover, the sequence numbers included in the last packet transmitted by the primary device are typically unknown to the backup device, making immediate accurate resumption of transmission impossible. Waiting for the associated acknowledgment message to be received before resuming transmission, or resuming transmission immediately by guessing the correct sequence numbers will both typically violate the strict constraints of layer 2 protocols. The result is that the data links typically must be torn down and re-established on failover. The tearing down and re-establishing of the data links can cause problems for devices at the other end of the links, and it falls significantly short of the ideal seamless transition at failover.

It would therefore be desirable to ameliorate the problems with the prior art systems.

SUMMARY

In accordance with first embodiments, there is a method of operating a data link between a first station and a second station, the first station comprising a first device and a second device, and the first station being configured to select either the first device or the second device for transmission on the data link of outbound data packets to the second station, said outbound data packets having respective sequence numbers, the method comprising:

- selecting the first device for transmission of said outbound data packets on the data link to the second station;
- receiving at the first and second devices at least one of a plurality of inbound data packets from the second station via the data link, said inbound data packets having respective acknowledgement sequence numbers relating to the respective sequence numbers of outbound data packets received at the second station;
- selecting the second device for transmission of said outbound data packets on the data link to the second station in dependence on a status indication relating to the first device; and
- transmitting an outbound data packet from the second device having a sequence number determined from a first acknowledgement sequence number, the first acknowledgement sequence number being the acknowledgement sequence number of said at least one of the plurality of inbound data packets received from the second station in response to an outbound data packet transmitted from the first device.

The sequence number of the outbound data packet transmitted from the second device can therefore be determined to be of a value that will not violate the constraints of an applicable layer 2 protocol, so that the second device may take over transmission on the link in place of the first device without the need for the link to be torn down and re-established.

In an embodiment, the method comprises determining the sequence number of the outbound data packet transmitted from the second device by the addition of a factor to the first acknowledgement sequence number. The sequence number of the outbound data packet transmitted from the second device can therefore be determined to be within an acceptable bound for an applicable layer 2 protocol. For example, a layer 2 protocol, such as MTP2 in Basic Error Correction (BEC) mode may require that a sequence number is not lower than the last transmitted sequence number, but is not greater than an expected sequence number by a certain amount.

In an embodiment, the method comprises determining said factor from a maximum number of outbound data packets that could have been transmitted subsequently to the transmission of the outbound data packet corresponding to the first acknowledgement sequence number, and before the receipt of said at least one of the plurality of inbound data packets from the second station via the data link. An upper bound can therefore be determined for the range of possible correct sequence numbers.

In an embodiment, the factor is one greater than the first number of outbound data packets. The determined sequence number can therefore be set to be greater than the correct sequence number.

In an embodiment, said outbound data packet transmitted from the second device does not have a payload. Payload can therefore be reserved for transmission in packets to be transmitted once the correct sequence number has been determined.

In an embodiment, the method comprises receiving a negative acknowledgement from the second station transmitted in response to receipt of said outbound data packet transmitted from the second device, the negative acknowledgement indicating a sequence number of a requested packet. The correct sequence number can therefore be established to resume transmission of payload.

In an embodiment, the method comprises transmitting at least a further outbound data packet from the second device having the sequence number of the requested packet. The correct sequence number can therefore be used for the transmission of payload and a negative acknowledgement would not be expected.

In an embodiment, the method comprises determining the sequence number of said outbound data packet transmitted from the second device to be the same as the first acknowledgement sequence number. The sequence number of the outbound data packet transmitted from the second device can therefore be determined to be of a value that will not violate the constraints of an applicable layer 2 protocol, such as MTP2 protocol operating in Preventative Cyclic Retransmission mode.

In an embodiment, the method comprises transmitting additional outbound data packets from the second device, the additional outbound data packets having a sequence number the same as a previously received acknowledgement sequence number. Packets can therefore be transmitted posing as retransmissions of previously sent packets by using sequence numbers equal to the last acknowledged sequence number received.

In an embodiment, the method comprises terminating transmission of said additional outbound data packets after a delay determined by a delay parameter. Transmission of packets having payload can therefore be resumed.

In an embodiment, the delay parameter relates to a round trip time associated with the data link. In an embodiment, the round trip time relates to a delay between the sending of a given outbound data packet from the first station to the second station and the receipt of an acknowledgement relating to the given outbound data packet at the first station. Therefore, after the expiry of the delay, transmitted outbound packets are expected to have up to date sequence numbers so that normal transmission of payload can be resumed.

In an embodiment, the method comprises transmitting an outbound data packet having a payload and a sequence number determined from an acknowledgement sequence number from an inbound packet received after the delay determined by the delay parameter. Up to date sequence numbers can therefore be determined for the transmitted outbound packet.

In an embodiment, the method comprises transmitting a plurality of outbound data packets having no payload from the second device for a pre-determined period, and performing the step of transmitting said outbound data packet from the second device after expiry of the predetermined period. Transmission of payload can therefore be delayed until expiry of a predetermined period, such that a correct sequence number has been established, but inbound data packets may be acknowledged before expiry of the predetermined period. This may be applicable, for example, in a layer 2 protocol such as LAP, for example LAP-D or LAP-B.

In an embodiment, said outbound data packet transmitted from the second device in said step has a sequence number determined from an acknowledgement sequence number derived from an inbound packet received after expiry of the predetermined period. The correct sequence number can therefore be established.

In an embodiment, the pre-determined period relates to a round trip time associated with the data link. In an embodiment, the round trip time relates to a delay between the sending of a given outbound data packet from the first station to the second station and the receipt of an acknowledgement relating to the given outbound data packet at the first station. Therefore, it can be assumed that after this period, all message frames sent before failover have been acknowledged, and normal transmission of packets having a payload using the correct sequence numbering can be resumed.

In an embodiment, the first station comprises a selection device, the first and second devices being connected to the selection device, and the selection device is configured to select either the first device or the second device for transmission on the data link of outbound packets. The first and second devices therefore need not each be configured to cease transmission when the other is transmitting.

In an embodiment, said selecting the second device for transmission of said data outbound packets on the data link to the second station is in dependence on the status indication relating to the first device indicating that the first device has failed. The first device can therefore be configured as a primary device and the second device may be configured as a backup device to be selected if the primary device fails.

In accordance with second embodiments, there is apparatus for operating a data link between a first station and a second station, the apparatus comprising the first station which comprises a first device and a second device, and the first station being configured to select either the first device or the second device for transmission on the data link of outbound data packets to the second station, the outbound data packets having respective sequence numbers, the apparatus comprising:

at least one processor; and at least one memory including computer program code, the memory and the computer program code being configured to cause the processor to:

select the first device for transmission of the outbound data packets on the data link to the second station;

receive at the first and second devices at least one of a plurality of inbound data packets from the second station via the data link, the inbound data packets having respective acknowledgement sequence numbers relating to the respective sequence numbers of outbound data packets received at the second station;

select the second device for transmission of the outbound data packets on the data link to the second station in dependence on a status indication relating to the first device; and transmit an outbound data packet from the second device having a sequence number determined from a first acknowledgement sequence number, the first acknowledgement sequence number being the acknowledgement sequence number of the at least one of the plurality of inbound data packets received from the second station in response to an outbound data packet transmitted from the first device.

In accordance with third embodiments, there is a computer program product comprising a non-transitory computer-readable storage medium having computer readable instructions stored thereon, the computer readable instructions being executable by a computerised device to cause the computerised device to perform a method of operating a data link between a first station and a second station, the first station comprising a first device and a second device, and the first station being configured to select either the first device or the second device for transmission on the data link of outbound data packets to the second station, the outbound data packets having respective sequence numbers, the method comprising:

selecting the first device for transmission of the outbound data packets on the data link to the second station;

receiving at the first and second devices at least one of a plurality of inbound data packets from the second station via the data link, the inbound data packets having respective acknowledgement sequence numbers relating to the respective sequence numbers of outbound data packets received at the second station;

selecting the second device for transmission of the outbound data packets on the data link to the second station in dependence on a status indication relating to the first device; and transmitting an outbound data packet from the second device having a sequence number determined from a first acknowledgement sequence number, the first acknowledgement sequence number being the acknowledgement sequence number of the at least one of the plurality of inbound data packets received from the second station in response to an outbound data packet transmitted from the first device.

Further features and advantages will be apparent from the following description of embodiments, which are given by way of example only.

DETAILED DESCRIPTION

An embodiment will now be described in the context of layer 2 data links operating according to MTP2 protocol in Basic Error Correction (BEC) mode and Preventative Cyclic Retransmission (PCR) mode, and operating according to LAP protocol. However, it will be understood that this is by way of example only and that other embodiments may involve other types of data links, and that embodiments are not limited to the use of a particular protocol.

Embodiments allow a device, such as a switch, in a data link to failover without violating the strict constraints of a layer 2 protocol, thereby avoiding the tearing down and re-establishment of the data links and providing a seamless transition from the point of view of neighbouring devices.

Figure 1:
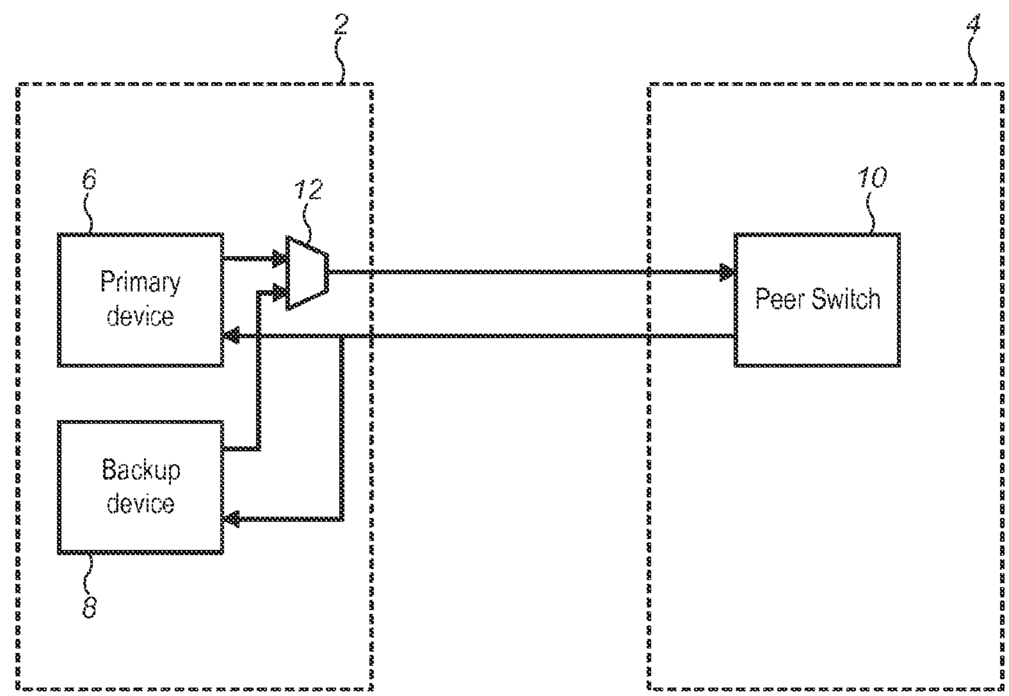
FIG. 1 is a schematic diagram illustrating an embodiment.

FIG. 1 is a schematic diagram illustrating an embodiment. A data link is operated between a first station 2 and a second station 4. The first station 2 comprises a first device 6, which may be a primary device, such as a switch, and a second device 8, which may be a backup device for the primary device. In the embodiment illustrated, the first and second devices are connected to a selection device 12, and the selection device 12 is configured to select either the first device 6 or the second device 8 for transmission on the data link of outbound data packets to the second station 4, the outbound data packets having respective sequence numbers. The second station 4 may comprise a peer switch 10, which may be a similar type of device to the first and second devices, such as a switch. The second station 4 may be similar to the first station 2, in that it may comprise more than one device.

Initially, the first device 6, typically the primary device, is selected for transmission of the outbound data packets on the data link to the second station 4; this is the typical method of operation when the primary device has not failed. The first and second devices receive inbound data packets from the second station via the data link, the inbound data packets having respective acknowledgement sequence numbers relating to the sequence numbers of outbound packets received at the second station. Sequence numbers are typically cyclical, typically to modulo 128. In the embodiment shown in FIG. 1, the output of both the first 6 and second 8 devices are connected to the selection device 12, which determines which signal to pass on to the peer. During failover, the selection device switches from passing the output of the first device 6 to passing the output of the second device 8. In an alternative embodiment to that shown in FIG. 1, selection hardware may not necessarily be provided as a separate device, and instead transmission may be enabled from one or other of the first and second devices.

Figure 2:
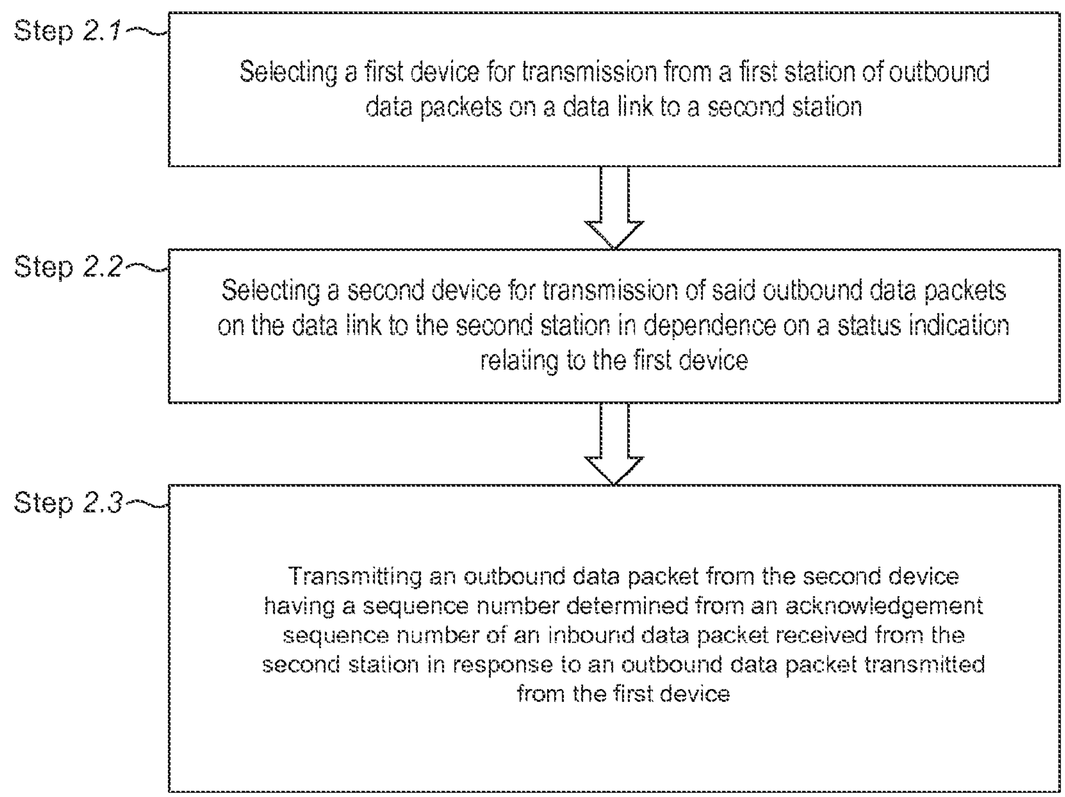
FIG. 2 is a flow chart illustrating an embodiment.

FIG. 2 is a flow diagram illustrating a method of operating a data link according to an embodiment. At step 2.1, as has already been mentioned, the first device 6 is selected for transmission from the first station 2 of outbound data packets on the data link to the second station 4. Then at step 2.2 the second device 8, typically the backup device, is selected in dependence on a status indication relating to the first device 6, for example an indication that the first device 6 has failed. Then, at step 2.3 of FIG. 2, the second device 8 transmits an outbound data packet having a sequence number determined from an acknowledgement sequence number of an inbound data packet received from the second station 4 in response to an outbound data packet transmitted from the first device 6, in this embodiment the primary device. The sequence number of the outbound data packet transmitted from the second device 8 may be determined to be of a value that will not violate the constraints of an applicable layer 2 protocol, so that the second device 8 may take over transmission on the link in place of the first device 6 without the need for the link to be torn down and re-established.

For example, a layer 2 protocol, such as MTP2 in Basic Error Correction (BEC) mode may require that a sequence number is not lower than the last transmitted sequence number, but is not greater than an expected sequence number by a certain amount. In this case, the sequence number of the outbound data packet transmitted from the second device 8 may be determined by the addition of a factor to the acknowledgement sequence number of the received inbound packet.

The factor may be determined to be one greater than a maximum number of outbound data packets that could have been transmitted subsequently to the transmission of the outbound data packet corresponding to the first acknowledgement sequence number, and before the receipt of the inbound data packet. In embodiments, the factor may be determined to be the same as, or one less than, the maximum number of outbound data packets that could have been transmitted subsequently to the transmission of the outbound data packet corresponding to the first acknowledgement sequence number, and before the receipt of the inbound data packet. In the context of a MTP2 protocol, data packets may be referred to as signal units (SUs).

The outbound data packet transmitted from the second device 8 is transmitted without a payload in this embodiment. A negative acknowledgement is transmitted from the second station in response to receipt of the outbound data packet which has a non-consecutive sequence number. The negative acknowledgement indicates a sequence number of a requested packet, and so the correct sequence number may be established to resume transmission of payload.

In another embodiment, the data link may be operated according to MTP2 protocol in Preventative Cyclic Retransmission mode. In this case, the sequence number of the outbound data packet transmitted from the second device 8 may be determined to be the same as the first acknowledgement sequence number. Additional outbound data packets may be transmitted, posing as retransmissions of previously sent packets by using sequence numbers equal to the last acknowledged sequence number received. The transmission of the additional outbound data packets may be terminated after a delay determined by a delay parameter relating to a round trip time associated with the data link. The round trip time may relate to a delay between the sending of a given outbound data packet from the first station 2 to the second station 4 and the receipt of an acknowledgement relating to the given outbound data packet at the first station 2. After the expiry of the delay, transmitted outbound packets are expected to have up to date sequence numbers so that normal transmission of payload can be resumed.

In a further embodiment, the data link may be operated according to a LAP protocol. In this context, data packets may be referred to as frames. In this case, a series of outbound data packets having no payload are transmitted from the second device 8 for a pre-determined period, and an outbound data packet having a sequence number determined from the acknowledgement sequence number of a received inbound packet is transmitted after expiry of the predetermined period, carrying a payload. In this way, transmission of payload may be delayed until expiry of a predetermined period, such that a correct sequence number has been established, but inbound data packets may be acknowledged before expiry of the pre-determined period. In this embodiment, the acknowledgement sequence number used to determine the sequence number of the outbound packet having a payload is derived from an inbound packet received after expiry of the predetermined period. The pre-determined period may relate to a round trip time associated with the data link. It may be assumed that after this period, all message packets, sent before failover have been acknowledged, and normal transmission of packets having a payload using the correct sequence numbering can be resumed.

In embodiments, the data link may be a Signalling System (SS7) link using MTP2 as the layer 2 protocol, which can operate in the Basic Error Correction (BEC) mode or Preventative Cyclic Retransmission (PCR) mode. MTP2 typically requires a continuous transmission of packets (containing sequence number information) in order to avoid the link being failed.

In a first embodiment, the data link operates using MTP2 protocol in BEC mode. In BEC mode, as has already been mentioned, each transmitted sequence number must not be lower than the last transmitted sequence number (such behaviour would result in the link being failed). In the first embodiment, the existing maximum window size parameter is used, which is a characteristic of a given link, and defines the largest number of packets that may go unacknowledged at any given time. This is added to the last sequence number for which an acknowledgement has been received in order to calculate an upper bound for the range of possible correct sequence numbers. A number one higher than this upper bound is used in packets transmitted by the backup device immediately after failover as it is guaranteed to be greater than the correct sequence number, and also not exceed the correct sequence number by such a large amount as to inadvertently trigger link failure. These initial packets sent by the new primary (that is to say the second device 8, selected for transmission after failover) have no payload. When the first packet transmitted by the new primary is received by the peer, the peer assumes that a few packets have been dropped (equal to the transmitted sequence number minus the correct sequence number), which is an acceptable occurrence for a layer 2 protocol, and sends a negative acknowledgement to request that these "missing" packets are retransmitted. When this request is received by the new primary, it now knows what the correct sequence number was and can resume transmission from this sequence number accordingly. Packets with payload can begin being sent again once the negative acknowledgement has been received from the peer. Hence it can be seen that in the first embodiment, the generated packet sequence triggers the peer to explicitly provide the necessary recovery information.

In a second embodiment, the data link operates using MTP2 protocol in PCR mode. In PCR mode, all unacknowledged message packets are typically cyclically retransmitted until they are acknowledged. Hence, in the second embodiment dummy packets are transmitted posing as retransmissions of previously sent packets by using sequence numbers equal to the last acknowledged sequence number received (the lower bound calculated previously). This ensures that the packets will be dropped by the peer as retransmissions and the payload will not be inspected. Once this process has been carried out for longer than a known round trip time associated with the link, the new primary now has up-to-date sequence numbers, and can resume normal transmission. The round trip time is typically based on a known network parameter such as the loop delay parameter which may be configured to an appropriate value by a network administrator.

In a third embodiment, the data link may relate to ISDN or GR-303 and may operate using a LAP protocol such as LAP-D or LAP-B as the layer 2 protocol. In this context, data packets may be referred to as frames. LAP-D has no requirement for continuous frame transmission (in between frame transmissions a continuous sequence of flags are generated and transmitted). Also, in LAP-D, acknowledgement packets that do not contain a payload do not require inclusion of a sequence number identifying the message packets which have been transmitted, only the sequence number used to acknowledge received message packets. Hence, in the third embodiment, generating flags and transmitting acknowledgement frames may be immediately resumed as packets are received from the peer. This operation is maintained for the duration of a maximum message acknowledgement time parameter. Once this time has elapsed, the new primary knows that all message frames sent before failover must have been acknowledged, and can resume normal transmission using the correct sequence numbering.

Hence, it can be seen that in the second and third embodiments, the generated packets allow the link to be maintained while any remaining frames transmitted by the old primary are flushed through the system, after which this the new primary can continue using the link as though no failure had occurred.

Embodiments will now be described in more detail by reference to examples of time sequences showing propagation of data packets along the data link.

In the first and second embodiments, in which the data link operates using MTP2 protocol, for the new primary (that is to say the second device 8, selected for transmission after failover) to maintain the healthy signalling links, the new primary should not send an acknowledgement sequence number, that may be referred to as a Backward Sequence Number (BSN), less than the old primary's last-transmitted BSN (this would imply that the peer should retransmit something that has already been acknowledged, and that the peer will have therefore discarded). Furthermore, the new primary should not send a BSN greater than the highest sequence number, that may be referred to as a Forward Sequence Number (FSN) transmitted by the peer (this would imply acknowledgement of something the peer has not yet transmitted), and should not send an FSN less than the old primary's highest-transmitted FSN (this would be a protocol error).

In the first embodiment, in which the data link operates in BEC mode, each Message Signal Unit (MSU), which is a data packet that contains a payload, is sent only once, unless a negative acknowledgement indicates that message loss has occurred. When no MSUs are to be sent, up-to-date Fill-In Signal Units (FISUs), which are data packets without payload, are generated with the same FSN as the last-transmitted MSU, and BSNs to acknowledge incoming messages.

Figure 3:
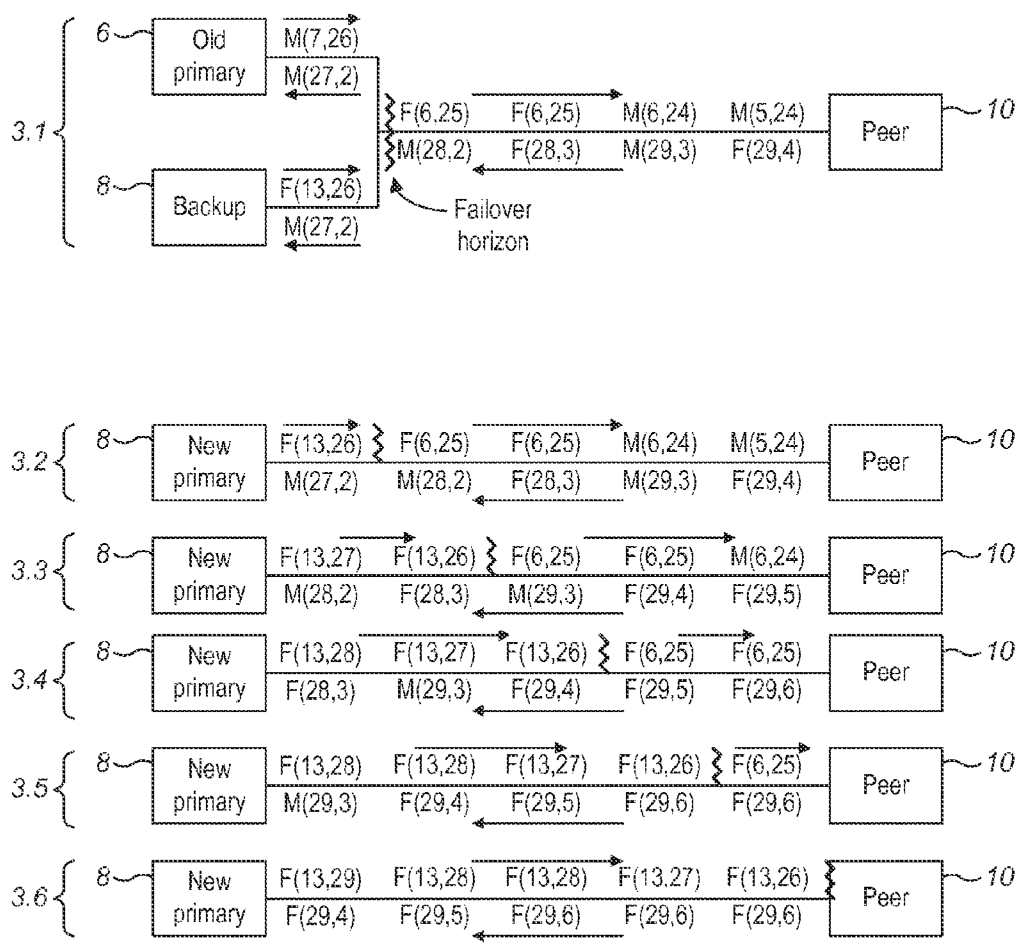
FIG. 3 is a diagram illustrating a time sequence of signal flow following failover according to a first embodiment.
Figure 4:
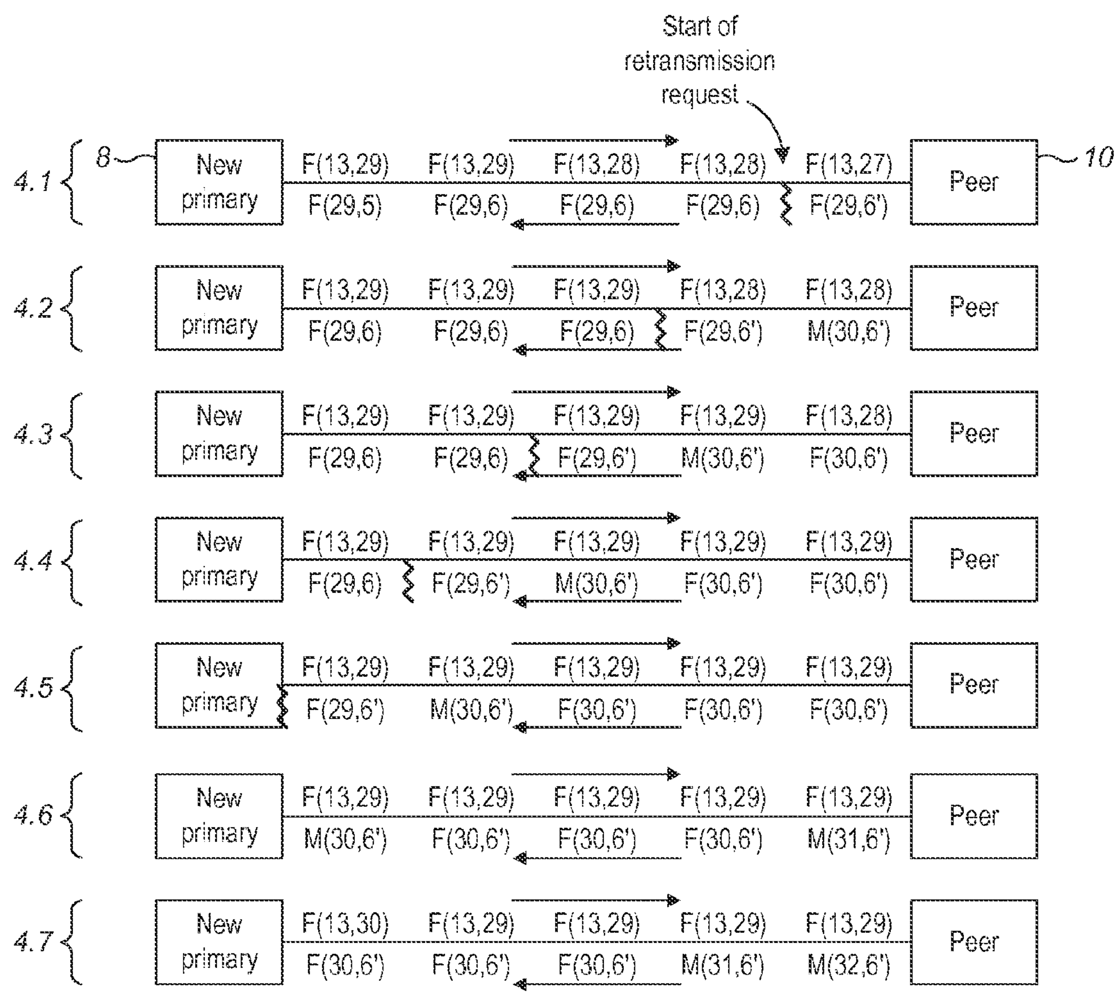
FIG. 4 is a diagram illustrating a time sequence of signal flow showing a retransmission request according to the first embodiment.
Figure 5:
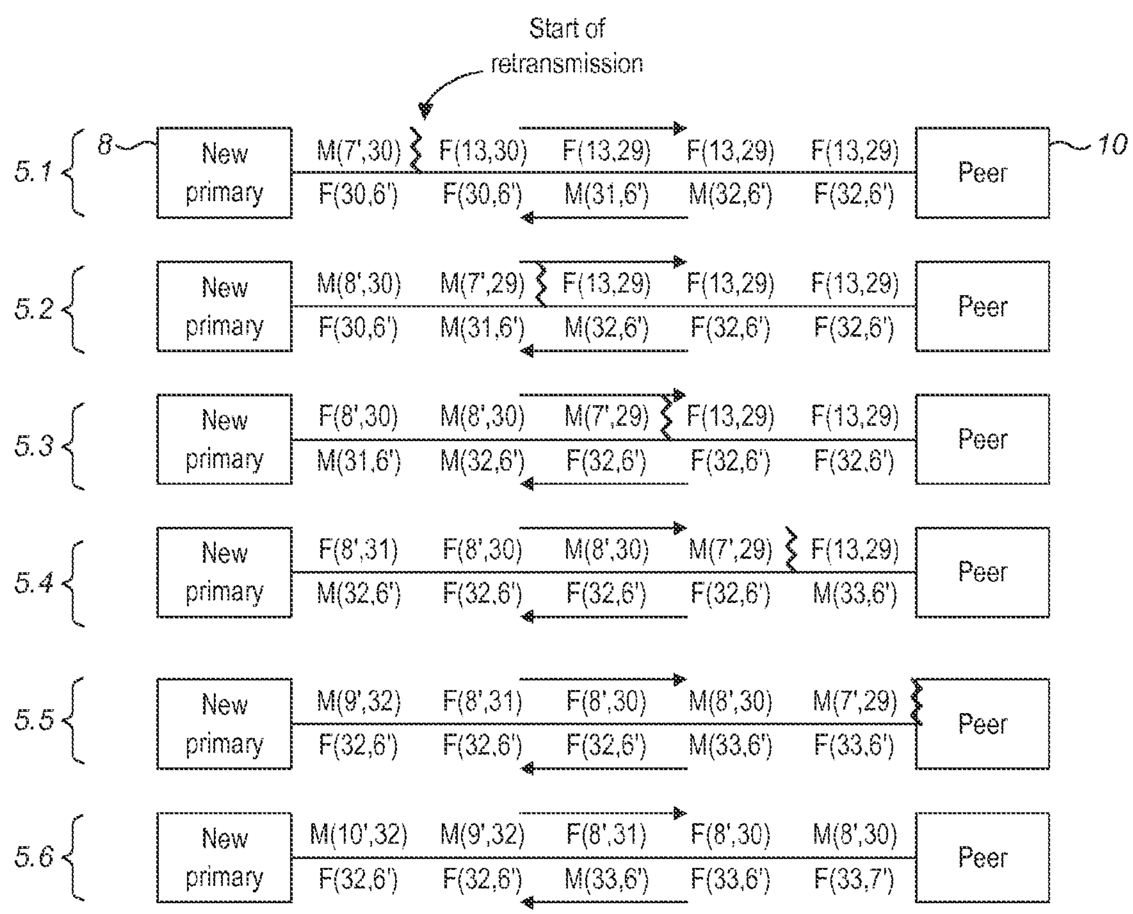
FIG. 5 is a diagram illustrating a time sequence of signal flow showing start of retransmission according to the first embodiment.

FIG. 3 is a diagram illustrating a time sequence of signal flow following failover according to a first embodiment. In FIGS. 3, 4 and 5, data packets are identified by the format M(FSN, BSN) to signify a MSU, and F(FSN, BSN) to signify a FISU. An apostrophe on the FSN (i.e FSN') signifies that the Forward Information Bit (FIB) is inverted, and an apostrophe on the BSN (i.e. BSN') signifies that the Backward Information Bit (BIB) is inverted. An inverted BIB typically indicates a negative acknowledgement, and the FIB on outgoing messages is typically inverted to match the incoming BIB, indicating that the outgoing message is a retransmission.

In FIG. 3, section 3.1 shows the messages flowing on an example signalling link immediately before failover occurs. The backup is receiving messages from the peer simultaneously with the old primary, but the outbound (FISU) messages from the backup are dropped. Note that the FISU being transmitted by the backup has a significantly greater FSN; this ensures that the peer will send a negative acknowledgement.

Sections 3.2 and 3.3 show the messages flowing on the example link immediately after failover, as the new primary's output has taken over (at 3.2) and after one message has passed along the link (at 3.3).

Sections 3.4, 3.5 and 3.6 show the message flows as the new primary's first message approaches the peer.

When the peer receives the FISU with FSN 13, it infers that messages 7-13 have been lost, and so it requests retransmission, by issuing a negative acknowledgement (by inverting the BIB in outgoing packets). The BSN remains unchanged, identifying the last message that was accepted by the peer. FIG. 4 shows, in sections 4.1 to 4.5, this negative acknowledgement being issued and approaching the new primary.

Upon receipt of the negative acknowledgement, the new primary can then inform its SS7 stack of the sequence numbers which are needed for recovery. In the meantime, it continues sending FISUs as shown in sections 4.6 and 4.7.

When the SS7 stack finishes coming up and has its first MTP2 MSU ready to transmit, it can do so. The peer believes this to be the "retransmission" it has requested. The FIB on these outgoing messages is inverted to match the incoming BIB, indicating the retransmission, as shown in FIG. 5, in sections 5.1 to 5.4. Once the peer has received the "retransmission", normal operation on the link is fully resumed, as shown in sections 5.5 and 5.6. Typically all messages received by the new primary during the recovery period are dropped and never sent to the SS7 stack. In the above example, this includes MSUs with FSNs 27-30.

In the first embodiment, the BSN may be set to a received FSN, so that the BSN indicates acknowledgement of whatever was last received from the peer. It must, therefore, be a valid BSN at the time of failover, and the old primary could not have transmitted a higher BSN. The loss of MTP3 messages during failover is typically acceptable.

FSN may be set to the received BSN plus the maximum window size for the link plus 1. At the time of failover, the old primary could have transmitted MSUs with FSNs up to whatever the peer has acknowledged, plus W (the maximum window size for the link). By sending a FISU with an FSN one greater than that, we can be guaranteed that the peer will send a negative acknowledgement, as it will be assumed that messages have been lost on the link. (In the example of the first embodiment described above, W is 10, hence FISUs are transmitted with an FSN of 13).

The system is notified when the backup is coming up as the new primary, and from this point onwards does not increment the FSN with further positive acknowledgements that are received over the link. When in "coming-up" mode, the system waits for the negative acknowledgement, which will allow identification of the highest FSN sent by the old primary that was accepted. When the SS7 stack finishes coming up and has MSUs to send, it will use this information to start transmitting MSUs with FSNs that follow on sequentially, ensuring the protocol is satisfied. From this point onwards, normal operation can be resumed.

In the second embodiment, the data link may operate in Preventative Cyclic Retransmission (PCR) mode. PCR is usually applied to links which have a high latency (such as satellite links). In the PCR mode, each MSU is sent once initially, and then all unacknowledged MSUs are cyclically retransmitted until they are acknowledged. New MSUs are transmitted in preference to retransmissions, unless the retransmission buffer has reached its limit, at which point no new MSUs can be sent until new acknowledgements have been received and free space is made in the retransmission buffer. FISUs are only sent if there are no outstanding unacknowledged MSUs. Negative acknowledgements do not exist.

Figure 6:
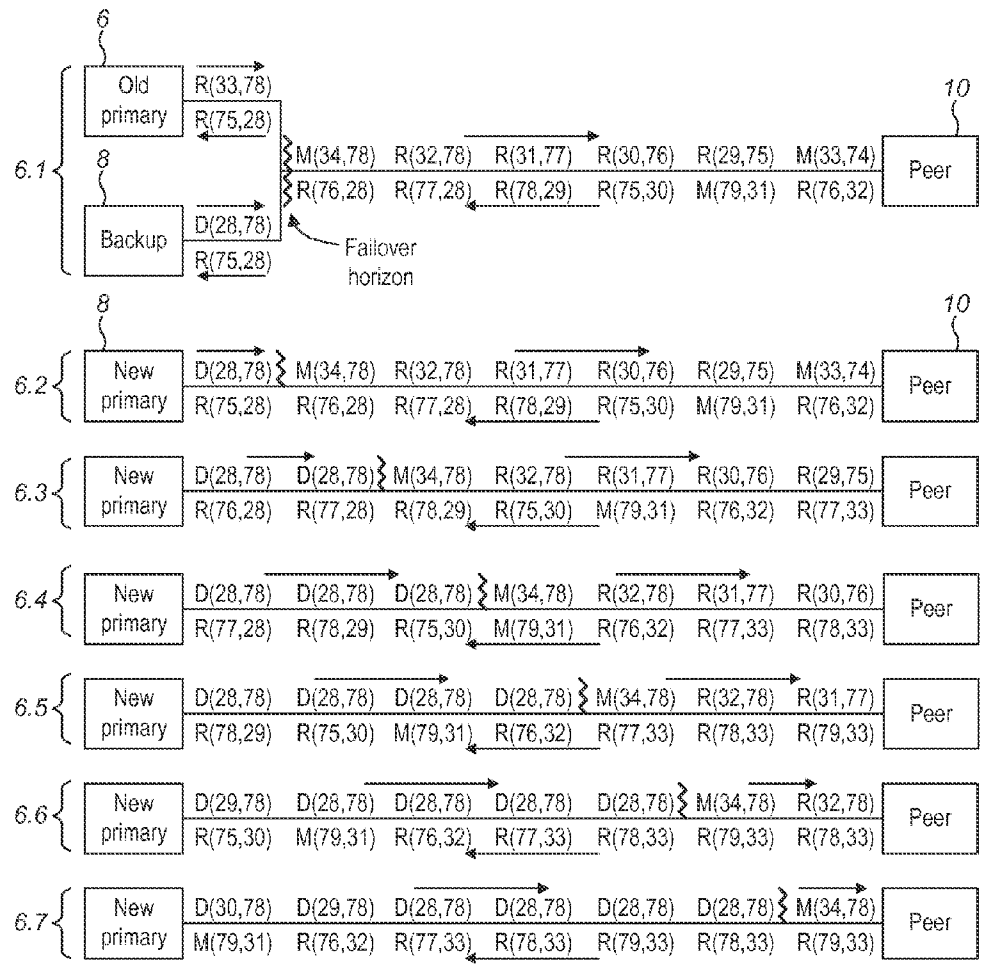
FIG. 6 is a diagram illustrating a time sequence of signal flow following failover according to a second embodiment.
Figure 7:
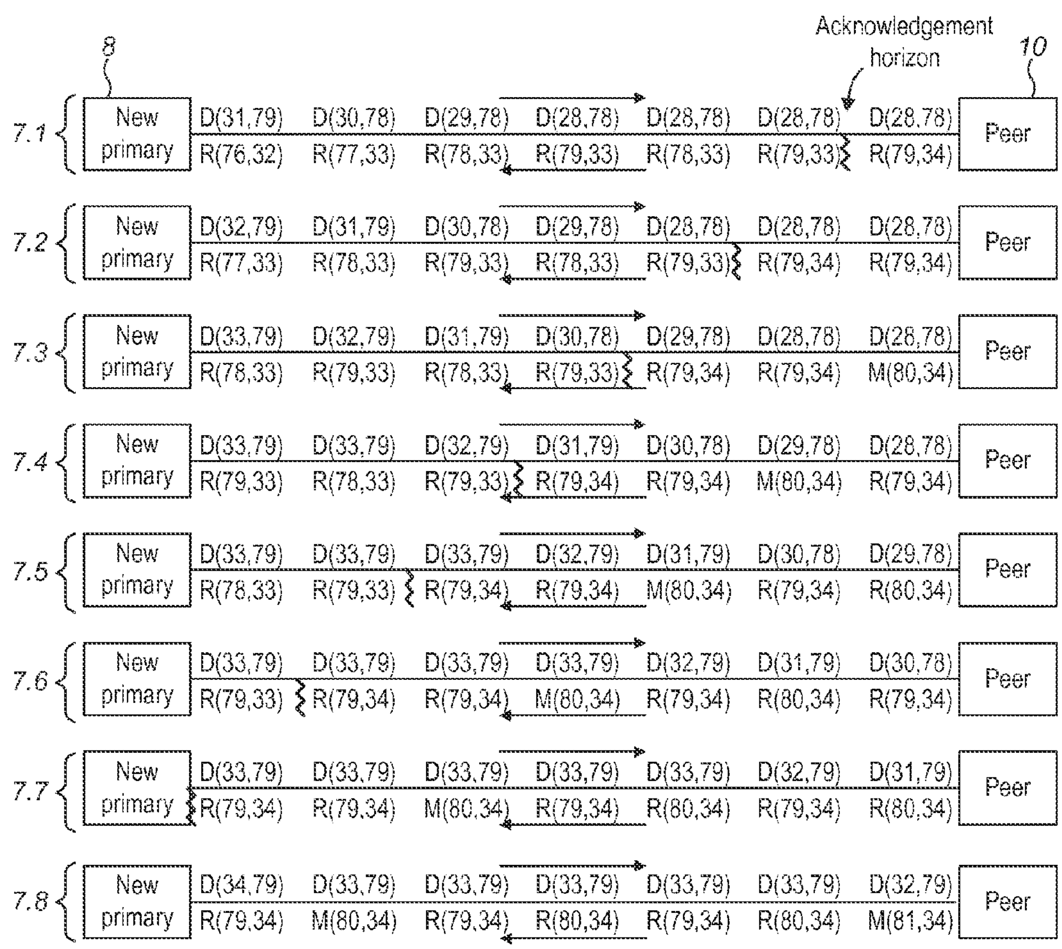
FIG. 7 is a diagram illustrating a time sequence of signal flow showing an acknowledgement according to the second embodiment.
Figure 8:
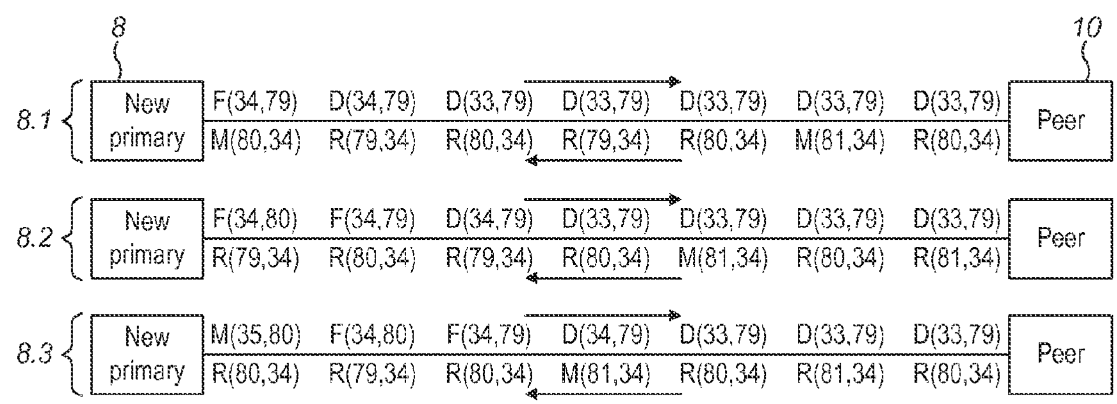
FIG. 8 is a diagram illustrating a time sequence of signal flow showing a packet having payload according to the second embodiment.

FIG. 6 is a diagram illustrating a time sequence of signal flow following failover according to the second embodiment. In FIGS. 6, 7 and 8, data packets are identified by the format M(FSN, BSN) to signify a MSU, and F(FSN, BSN) to signify a FISU. In addition, R(FSN, BSN) signifies a retransmitted MSU and D(FSN, BSN) signifies a dummy MSU.

Section 6.1 in FIG. 6 shows the messages flowing on an example data link, e.g. a signalling link, immediately before failover occurs. The backup is receiving messages from the peer simultaneously with the old primary, but the outbound (MSU) messages from the backup are dropped. Note that the dummy MSU being transmitted by the backup has an FSN matching what the peer has already acknowledged. This ensures that the peer will drop it as a retransmission.

Sections 6.2 and 6.3 show the messages flowing on the example link immediately after failover (as the new primary's output has taken over) and after one message has passed along the link. Sections 6.4 to 6.9 show the message flows as the new primary's first message approaches the peer. The peer then starts acknowledging the last message that was sent by the old primary. FIG. 7, in sections 7.1 to 7.7 show this acknowledgement being issued and approaching the new primary. Section 7.8 shows that the dummy MSU is up to date.

A recovery timer is started at failover, having a timed duration that is slightly greater than the round-trip delay of the link. Once this timed duration ends, the new primary informs the SS7 stack of the sequence numbers which are needed for recovery. Meanwhile, the new primary starts sending FISUs rather than dummy MSUs, as shown in FIG. 8, in sections 8.1 and 8.2. Then, when the SS7 stack finishes coming up and has its first MTP2 MSU ready to transmit, it can send it out over the link (with FSN 35), as shown by section 8.3.

Typically, all messages received by the new primary during the recovery period are dropped and not sent to the SS7 stack. In the above example, this includes MSUs with FSNs 79-80. In the second embodiment, with an in-service signalling link, the backup internally processes each SU that it receives, without passing it to the SS7 stack. Each time it receives an SU whose sequence numbers differ from the last-received SU, it sends a dummy MSU with the following sequence numbering.

The BSN is set to $FSN_{max}$, which is the maximum recently received FSN, $FSN_{rcv}$. The backup keeps track of $FSN_{max}$ because PCR means that the most recently received SU may not contain the highest acknowledged FSN. If ($FSN_{rcv}$> $FSN_{max}$) and ($FSN_{rcv}$<=($FSN_{max}$+W)), set $FSN_{max}$=$FSN_{rcv}$. When failover occurs, this BSN indicates acknowledgement of the highest-FSN MSU that was transmitted by the peer, therefore it is definitely valid. This may cause MTP3 messages to be lost, but this is typically acceptable.

The FSN is set to the received BSN, i.e $BSN_{rcv}$. The peer has already acknowledged this FSN, therefore will drop this dummy MSU as a retransmission. This is necessary, since it contains no valid MTP3 data, and should not be processed by the peer. When failover occurs, a timer is started, having a timed duration that is marginally greater than the round-trip delay time of the link. Until this timed duration expires, the new primary continues to behave as above, incrementing its BSN and FSN in accordance with any new messages that are received from the peer. When this timed duration expires, it can be assumed that all traffic sent by the old primary has been flushed through the system. At this point, the new primary starts sending FISUs (as there are no outstanding retransmissions, by definition) with the same sequence number settings as above, and informs the SS7 stack of these sequence numbers which are required for recovery. When MTP2 finishes coming up and has MSUs to send, it will use this information to start transmitting MSUs with FSNs that follow on sequentially, ensuring the protocol is satisfied. From this point onwards, normal operation can be resumed.

Typically this recovery method may not work if the RTB contains 127 frames; the dummy MSU could then be interpreted by the peer as the next valid MSU rather than a retransmission. Consequently, an artificial maximum window size of 126 may be introduced.

For simplicity, the above examples of the first and second embodiments show failover occurring after a clean transmission of an SU; this may be unlikely to occur in reality. It may be more likely for the old primary (and indeed the new primary as well) to be mid-way through transmission at the time of failover. Such truncated SUs (typically a maximum of two of them) may be discarded by the peer for being invalid lengths or failing their CRC checks. This may cause the peer to briefly enter octet counting mode and to increment its error rate monitors; however, neither of these events is exceptional and the link will not normally be failed by the peer as a result.

If SUs transmitted by the old primary are lost or corrupted around the time of failover, our sequence number recovery methods may be affected. In the first embodiment, for the link operating in BEC mode, if old primary SU loss causes the peer to send a negative acknowledgement, and this negative acknowledgement, which may be indicated by an inverted Backward Information Bit (BIB), has already started reaching the first station at the time of failover, the sequence number recovery method may fail. The new primary may futilely wait in for the BIB to be inverted again, and the link recovery will time out. This failure may be acceptable, as it is such an unlikely and narrow window. If old primary SU loss either before or shortly after failover causes the peer to send a negative acknowledgement, which reaches the new primary after failover, our sequence number recovery method will be unaffected. The new primary sees the negative acknowledgement and responds to it as if it was caused by our FISUs.

If SUs transmitted by the old primary are lost or corrupted around the time of failover in the case of the second embodiment, for the link operating in PCR mode, a lost MSU may either be recovered by one of the automatic retransmissions, or if not, all subsequent MSUs may be dropped. In either case, the sequence number recovery method will be unaffected.

Typically, in the cases described above where the sequence number recovery method is still successful, the packet loss will result in loss of transmitted MSUs. However, as described previously, this is typically acceptable.

If, in the first and second embodiments, the peer sends unexpected messages (e.g. LSSUs, or MSUs/FISUs with invalid sequence numbering) the sequence number recovery proceeds as normal as described above. The link may end up being taken down, but again this may be an acceptable edge case.

In the third embodiment, the link may relate, for example, to ISDN or GR-303 and may operate according to a LAP protocol such as LAP-D. In LAP-D, each information (I) frame may be sent only once, unless either a reject (REJ) frame indicates that message loss has occurred, or a timely acknowledgement is not received. A "frame" in this protocol corresponds to a data packet as referred to in the context of the first and second embodiments. When no I frames are to be sent, inbound I frames may be acknowledged by sending receive ready (RR) frames, which contain a Receive Sequence Number (N(r)) field but no Send Sequence Number (N(s)). On an in-service signalling link, the backup internally may process all I frames that it receives, without passing them up to the signalling stack. In this manner, the backup may be kept as up-to-date as possible with sequence number information; given that outbound traffic from the primary is not visible on the backup. The backup may generate and transmits an RR frame after each new I frame that is received, but these are dropped by the framer. Typically, frames do not need to be sent continuously; when the DSP has no frames to send out, it may continuously generate flags (for example, a repeated octet with bits set to 01111110). Typically, the receive sequence number N(r) describes the expected send sequence number of the next received I frame and is therefore an acknowledgement of the inbound frame whose N(s)= N(r)−1.

Figure 9:
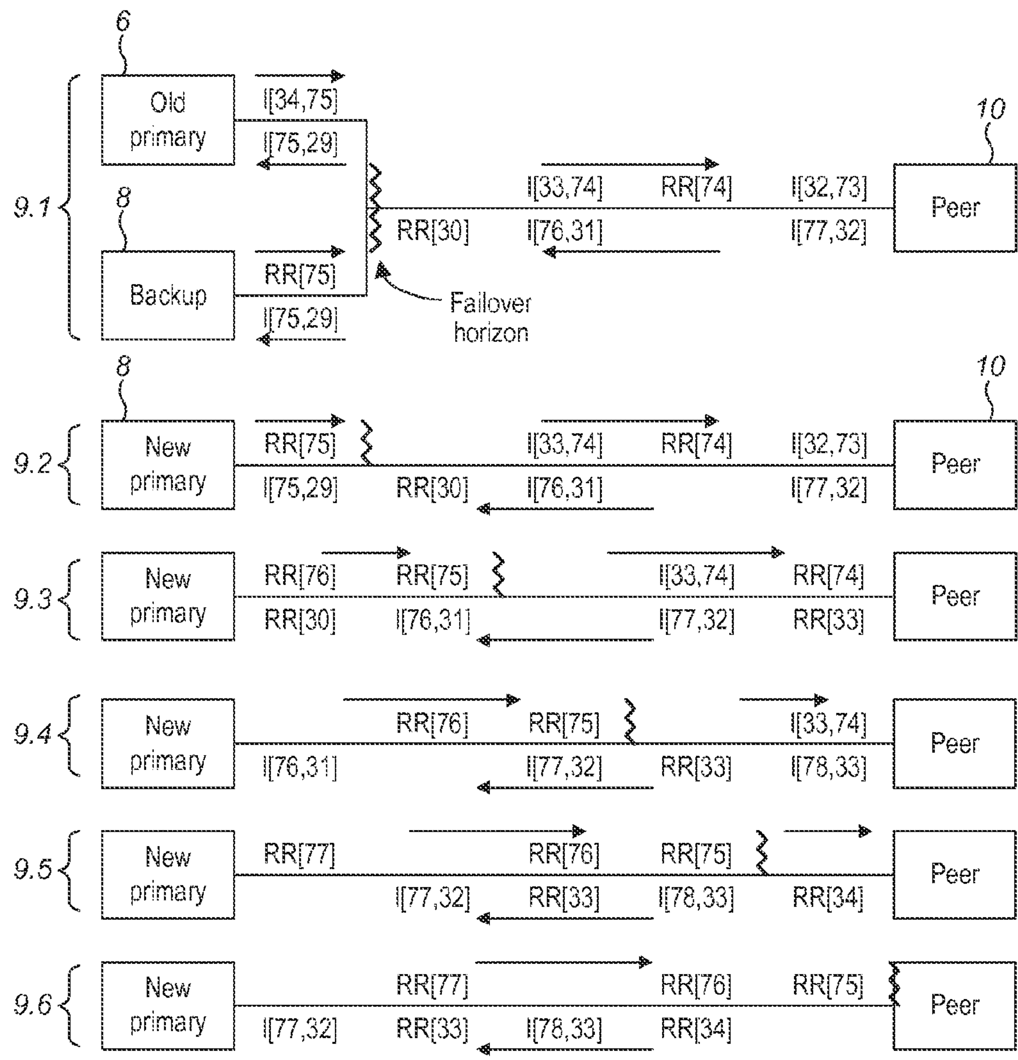
FIG. 9 is a diagram illustrating a time sequence of signal flow following failover according to a third embodiment.
Figure 10:
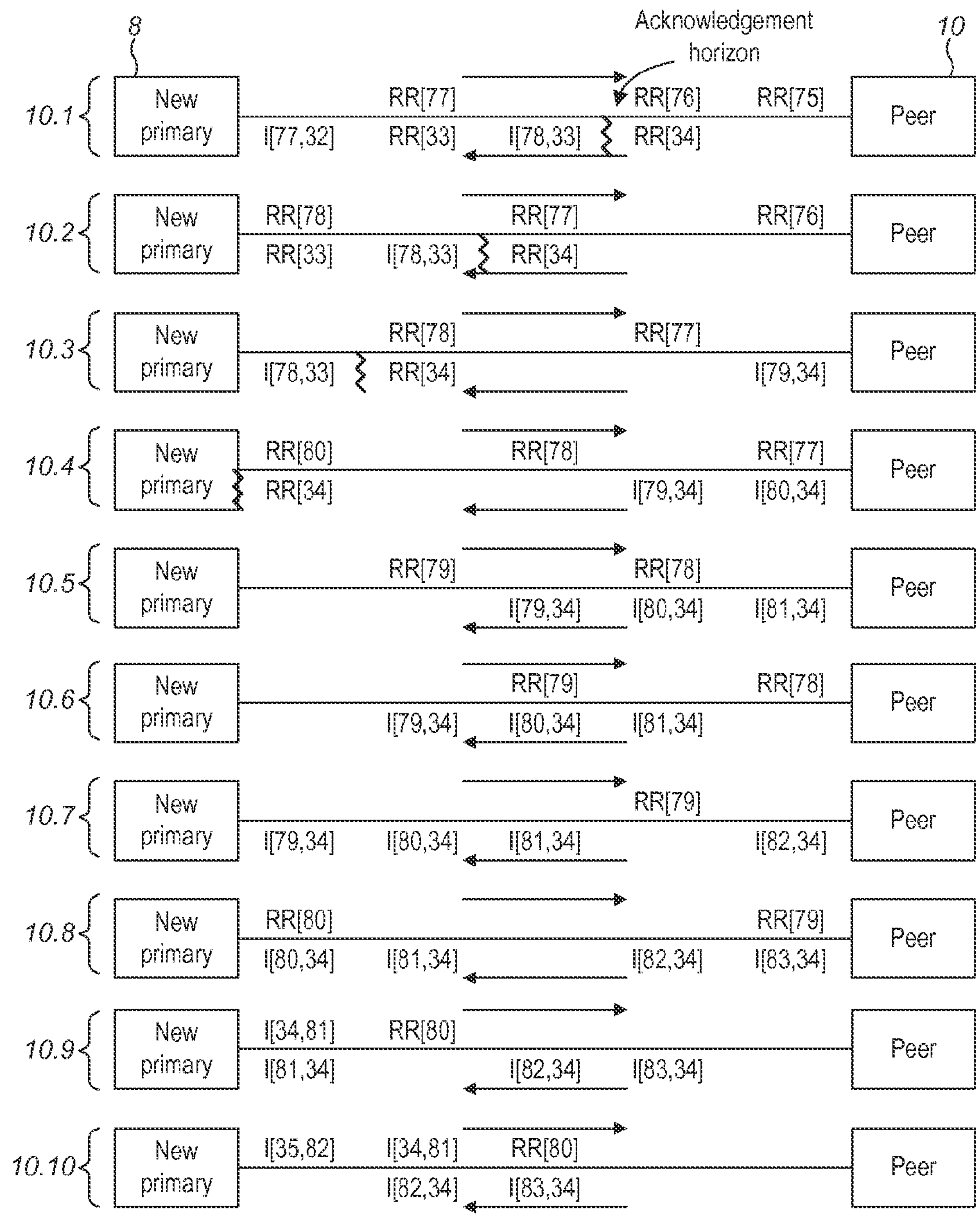
FIG. 10 is a diagram illustrating a time sequence of signal flow showing an acknowledgement and a packet having payload according to the third embodiment.

FIG. 9 is a diagram illustrating a time sequence of signal flow following failover according to the third embodiment. In FIGS. 9 and 10, data packets are identified by the format I[N(s), N(r)] to signify an I frame, and by the format RR[N(r)] to signify an RR frame.

FIG. 9 in section 9.1 shows the messages flowing on an example signalling link immediately before failover occurs. The backup is receiving messages from the peer simultaneously with the old primary, but the outbound (RR) messages from the backup are being dropped.

Sections 9.2 and 9.3 show the messages flowing on the example link immediately after failover, as the new primary's output has taken over, (at 9.2) and after one message has passed along the link (at 9.3).

Sections 9.4 to 9.6 show the message flows as the new primary's first message approaches the peer.

The peer sees no difference from normal link behaviour, and continues transmitting I frames as necessary. Also, note that the peer has now started acknowledging the last message that was sent by the old primary. FIG. 10, in sections 10.1 to 10.5 show this acknowledgement approaching the new primary. After section 10.5, the new primary has all the sequence number information needed for recovery. The new primary continues sending RR frames to acknowledge incoming frames, as shown in sections 10.6 to 10.8.

In the meantime, the signalling stack comes fully up and recovers the sequence number information from the new primary. From this point, normal operation is resumed, as shown in sections 10.9 and 10.10. Typically, all messages received by the new primary during the recovery period are dropped and never sent to the signalling stack. In the above example, this is the I-frames with N(s) 7-79.

As already described, in the third embodiment on an in-service signalling link, the backup typically internally processes each I frame that is received, and typically no messages are passed up to the signalling stack. Each time the backup receives a frame whose sequence numbers differ from the last-received frame, it may send an RR frame with N(r)=received N(s)+1. Additionally, whenever the backup receives an I, RR, RNR or REJ frame with the P bit set to 1, it will send an RR frame with the F bit set to 1. When failover occurs, a timer is started, whose duration is slightly greater than T200 (the time in which an I frame must be acknowledged, which has a default value of 1 second). Until this duration expires, the new primary continues to behave as above, incrementing the value of N(r) sent on outgoing RR frames as necessary. When the duration expires, it may be assumed that all traffic sent by the old primary has been flushed through the system. A second timer may be provided to clean up any links that fail to be recovered after failover.

For simplicity, the above examples of the third embodiment show failover occurring after a clean transmission of a frame; this may be unlikely to occur in reality. It may be more likely for the old primary (and indeed the new primary as well) to be mid-way through transmission at the time of failover. Such truncated frames (typically a maximum of two of them) may be discarded by the peer for being invalid lengths or failing their Frame Check Sequence (FCS) checks. These may be discarded silently by the peer. This is an unexceptional event and will not typically result in the peer failing the link. If frames transmitted by the old primary are lost or corrupted around the time of failover, the peer may send a REJ frame, and stop incrementing its N(r). This typically causes no problems for the recovery method of the third embodiment. The frame loss will result in loss of transmitted MSUs; however, this is typically an acceptable trade-off. In order to handle the REJ condition, once a link has been recovered, the new primary may translate all inbound REJ frames to RR frames before passing them to the signalling stack, until the second recovery timer times out.

If, while we are being promoted, the peer sends unexpected frames (e.g. DISC), the recovery process may proceed as normal as described in connection with the third embodiment. The link may end up being taken down, but again this is typically an acceptable edge case.

If the peer is in RNR state at the time of failover, recovery of the link will be attempted as normal according to the third embodiment. If the RNR state persists, the peer busy condition will typically become established on the new primary signalling stack by normal protocol methods. If the old primary was in RNR state at the time of failover, the recovery processing may cause the peer to take down the link. This is typically unavoidable and typically an acceptable edge case. If the old primary fails just as a link is being set up or taken down, the replication message may not get sent to the backup that is taking over. For a link that is being taken down this is not a problem; the link will never be put back into service during promotion and will just be cleaned up by the promotion processing. For a link being put into service, at worst the link may be taken down as it may be that no frames or no consistent frames are sent. This is unavoidable and typically an acceptable edge case.

So, it may be seen from the examples above that, in an embodiment, in order to prevent violation of the constraints of a layer 2 protocol, the backup device immediately resumes transmission, and provides sequence numbers that will not result in the peer failing the link. As the backup device is aware of incoming packets that have been received, it is able to track the sequence numbering of the packets received from the peer. By tracking the sequence number of the received message packets, the backup can correctly resume the sequence numbering used to acknowledge the packets received from the peer.

However, the backup device may not be able to accurately predict the correct sequence number representative of the message packets transmitted by the primary device. This is partially addressed by the backup device also tracking the sequence numbers acknowledged by the peer in received packets. This effectively determines a lower bound for the range of possible correct sequence numbers. In itself this may be insufficient to determine the actual correct sequence number since there may be a number of message packets en route to the peer (sent by the old primary) that have not been acknowledged yet and there may be a number of packets en route from the peer including acknowledgements that have not been received yet.

On the basis of these two tracked parameters, the backup device is able to determine a sequence of packets that can be transmitted in order to prevent failure of the communications link after device failover. The formulation of this sequence of packets depends on the exact layer 2 protocol in use on the link. Various embodiments have been described by reference to the time sequences of FIGS. 3-10, which show sequences of packets at different stages of propagation along the data link, with appropriate sequence numbers.

By artificially maintaining the link in this manner, there may be a small loss of layer 3 data contained in those packets received at the new primary after failover, but before higher layer software instances are ready to handle that data. This may be traded off against the benefit of not having to restart the layer 2 link.

In an embodiment, in order to provide immediate failover, the backup device may be constantly generating these packet sequences, but they are only transmitted to the peer at the second station when the selection hardware is reconfigured, which occurs on failover.

The above embodiments are to be understood as illustrative examples. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of operating a data link between a first station and a second station, the method comprising:

selecting, at the first station, wherein the first station includes a first device and a second device and wherein the first station is configured to select either the first device or the second device for transmission on the data link of outbound data packets to the second station, the first device for transmission of the outbound data packets on the data link to the second station, wherein the outbound data packets have respective sequence numbers and wherein there is no communication between the first device and the second device of the outbound data packets;

receiving, at the first and second devices, at least one of a plurality of inbound data packets from the second station via the data link, the inbound data packets having respective acknowledgement sequence numbers relating to the respective sequence numbers of outbound data packets received at the second station, wherein there is no communication between the first device and the second device of the plurality of inbound data packets from the second station;

selecting the second device for transmission of the outbound data packets on the data link to the second station in dependence on a status indication relating to the first device, wherein the status indication indicates a failure of the first device; and transmitting, after the status indication indicates the failure of the first device, an outbound data packet from the second device having a sequence number determined from a first acknowledgement sequence number, the first acknowledgement sequence number being the acknowledgement sequence number of the at least one of the plurality of inbound data packets received from the second station in response to an outbound data packet transmitted from the first device, wherein the sequence number for the outbound data packet transmitted from the second device is determined after the status indication indicates the failure of the first device; and wherein the sequence number for the outbound data packet transmitted from the second device is determined without communication between the second device and the first device.

2. The method of claim 1, further comprising determining the sequence number of the outbound data packet transmitted from the second device by the addition of a factor to the first acknowledgement sequence number.

3. The method of claim 2, further comprising determining the factor from a maximum number of outbound data packets that could have been transmitted subsequently to the transmission of the outbound data packet corresponding to the first acknowledgement sequence number, and before the receipt of the at least one of the plurality of inbound data packets from the second station via the data link.

4. The method of claim 3, wherein the factor is one greater than the first number of outbound data packets.

5. The method of claim 1, wherein the outbound data packet transmitted from the second device does not have a payload.

6. The method of claim 1, further comprising receiving a negative acknowledgement from the second station transmitted in response to receipt of the outbound data packet transmitted from the second device, the negative acknowledgement indicating a sequence number of a requested packet.

7. The method of claim 6, further comprising transmitting at least a further outbound data packet from the second device having the sequence number of the requested packet.

8. The method of claim 7, wherein the further outbound data packet has a payload.

9. The method of claim 1, wherein the data link operates in Basic Error Correction mode for MTP2 protocol.

10. The method of claim 1, further comprising determining the sequence number of the outbound data packet transmitted from the second device to be the same as the first acknowledgement sequence number.

11. The method of claim 10, further comprising transmitting additional outbound data packets from the second device, the additional outbound data packets having a sequence number the same as a previously received acknowledgement sequence number.

12. The method of claim 11, further comprising terminating transmission of the additional outbound data packets after a delay determined by a delay parameter.

13. The method of claim 12, wherein the delay parameter relates to a round trip time associated with the data link.

14. The method of claim 13, wherein the round trip time relates to a delay between the sending of a given outbound data packet from the first station to the second station and the receipt of an acknowledgement relating to the given outbound data packet at the first station.

15. The method of claim 12, further comprising transmitting an outbound data packet having a payload and a sequence number determined from an acknowledgement sequence number from an inbound packet received after the delay determined by the delay parameter.

16. The method of claim 10, wherein the data link operates in Preventative Cyclic Retransmission mode for MTP2 protocol.

17. The method of claim 1, further comprising:

transmitting a plurality of outbound data packets having no payload from the second device for a pre-determined period, and performing the step of transmitting the outbound data packet from the second device after expiry of the predetermined period.

18. The method of claim 17, wherein the outbound data packet transmitted from the second device in the step has a sequence number determined from an acknowledgement sequence number derived from an inbound packet received after expiry of the predetermined period.

19. The method of claim 17, wherein the pre-determined period relates to a round trip time associated with the data link.

20. The method of claim 19, wherein the round trip time relates to a delay between the sending of a given outbound data packet from the first station to the second station and the receipt of an acknowledgement relating to the given outbound data packet at the first station.

21. The method of claim 17, wherein the outbound data packet transmitted from the second device in the step has a payload.

22. The method of claim 17, wherein the data link uses a LAP protocol.

23. The method of claim 1, wherein the first station comprises a selection device, the first and second devices being connected to the selection device, and the selection device is configured to select either the first device or the second device for transmission on the data link of outbound packets.

24. The method of claim 1, wherein the selecting the second device for transmission of the data outbound packets on the data link to the second station is in dependence on the status indication relating to the first device indicating that the first device has failed.

25. An system for operating a data link between a first station and a second station, the system comprising:

a data store comprising executable software; and at least one processor in data communication with the data store, the processor configured to execute the software and cause a computing device to:

select, at the first station, wherein the first station includes a first device and a second device and wherein the first station is configured to select either the first device or the second device for transmission on the data link of outbound data packets to the second station, the first device for transmission of the outbound data packets on the data link to the second station, wherein the outbound data packets have respective sequence numbers and wherein there is no communication between the first device and the second device of the outbound data packets;

receive, at the first and second devices, at least one of a plurality of inbound data packets from the second station via the data link, the inbound data packets having respective acknowledgement sequence numbers relating to the respective sequence numbers of outbound data packets received at the second station, wherein there is no communication between the first device and the second device of the plurality of inbound data packets from the second station;

select the second device for transmission of the outbound data packets on the data link to the second station in dependence on a status indication relating to the first device, wherein the status indication indicates a failure of the first device; and transmit, after the status indication indicates the failure of the first device, an outbound data packet from the second device having a sequence number determined from a first acknowledgement sequence number, the first acknowledgement sequence number being the acknowledgement sequence number of the at least one of the plurality of inbound data packets received from the second station in response to an outbound data packet transmitted from the first device, wherein the sequence number for the outbound data packet transmitted from the second device is determined after the status indication indicates the failure of the first device; and wherein the sequence number for the outbound data packet transmitted from the second device is determined without communication between the second device and the first device.

26. A non-transitory computer-readable storage medium having computer executable instructions stored thereon, which, when executed by a processor, cause a computing device to perform a method of operating a data link between a first station and a second station, the method comprising:

selecting, at the first station, wherein the first station includes a first device and a second device and wherein the first station is configured to select either the first device or the second device for transmission on the data link of outbound data packets to the second station, the first device for transmission of the outbound data packets on the data link to the second station, wherein the outbound data packets have respective sequence numbers and wherein there is no communication between the first device and the second device of the outbound data packets;

receiving, at the first and second devices, at least one of a plurality of inbound data packets from the second station via the data link, the inbound data packets having respective acknowledgement sequence numbers relating to the respective sequence numbers of outbound data packets received at the second station, wherein there is no communication between the first device and the second device of the plurality of inbound data packets from the second station;

selecting the second device for transmission of the outbound data packets on the data link to the second station in dependence on a status indication relating to the first device, wherein the status indication indicates a failure of the first device; and transmitting, after the status indication indicates the failure of the first device, an outbound data packet from the second device having a sequence number determined from a first acknowledgement sequence number, the first acknowledgement sequence number being the acknowledgement sequence number of the at least one of the plurality of inbound data packets received from the second station in response to an outbound data packet transmitted from the first device, wherein the sequence number for the outbound data packet transmitted from the second device is determined after the status indication indicates the failure of the first device; and wherein the sequence number for the outbound data packet transmitted from the second device is determined without communication between the second device and the first device.

* * * * *